(12) United States Patent
Shimma et al.

(10) Patent No.: US 11,172,079 B2
(45) Date of Patent: Nov. 9, 2021

(54) MAINTENANCE MANAGEMENT APPARATUS, MAINTENANCE MANAGEMENT SYSTEM, METHOD OF MANAGING MAINTENANCE, AND RECORDING MEDIUM

(71) Applicants: Katsumasa Shimma, Kanagawa (JP); Yuji Takiya, Kanagawa (JP)

(72) Inventors: Katsumasa Shimma, Kanagawa (JP); Yuji Takiya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/583,708

(22) Filed: Sep. 26, 2019

(65) Prior Publication Data

US 2020/0137241 A1  Apr. 30, 2020

(30) Foreign Application Priority Data

Oct. 30, 2018 (JP) .............................. JP2018-204428

(51) Int. Cl.
  *G06F 15/00* (2006.01)
  *H04N 1/00* (2006.01)
  *G06F 3/12* (2006.01)

(52) U.S. Cl.
  CPC ......... *H04N 1/00344* (2013.01); *G06F 3/121* (2013.01); *G06F 3/1219* (2013.01); *G06F 3/1229* (2013.01)

(58) Field of Classification Search
  CPC ... H04N 1/00344; G06F 3/121; G06F 3/1219; G06F 3/1229

USPC ....................................................... 358/1.15
See application file for complete search history.

(56) References Cited

U.S. PATENT DOCUMENTS

| | | | |
|---|---|---|---|
| 2008/0310864 | A1 | 12/2008 | Katoh |
| 2014/0185084 | A1* | 7/2014 | Cudak ..................... G06F 3/126 358/1.15 |
| 2017/0041498 | A1* | 2/2017 | Kamasuka ......... H04N 1/00917 |
| 2017/0348970 | A1* | 12/2017 | Wakasa ................ B41J 2/04573 |

FOREIGN PATENT DOCUMENTS

| | | |
|---|---|---|
| JP | 2005-165467 | 6/2005 |
| JP | 2008-310579 | 12/2008 |

\* cited by examiner

*Primary Examiner* — Mark R Milia
(74) *Attorney, Agent, or Firm* — Harness, Dickey & Pierce, P.L.C.

(57) ABSTRACT

A maintenance management apparatus for managing maintenance on one or more devices, includes: circuitry to: obtain self-maintenance information indicating time at which self-maintenance has been performed on a device; obtain maintenance information indicating maintenance scheduled to be performed on the device from a memory, the maintenance information including time information indicating scheduled execution time of maintenance; update the time information indicating scheduled execution time of maintenance based on the self-maintenance information; and send a notification for prompting maintenance of the device when the time indicated by the time information having been updated is reached.

26 Claims, 13 Drawing Sheets

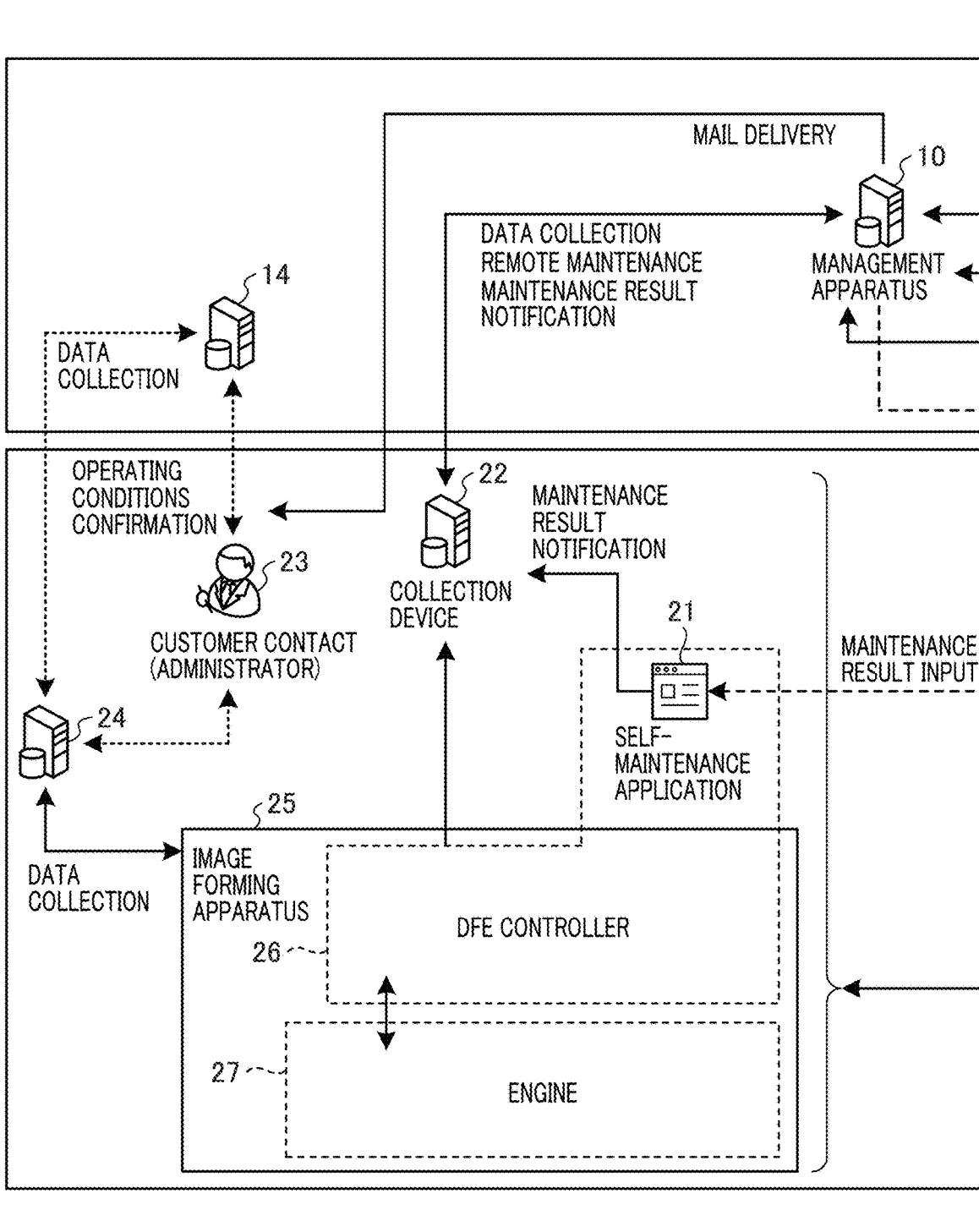

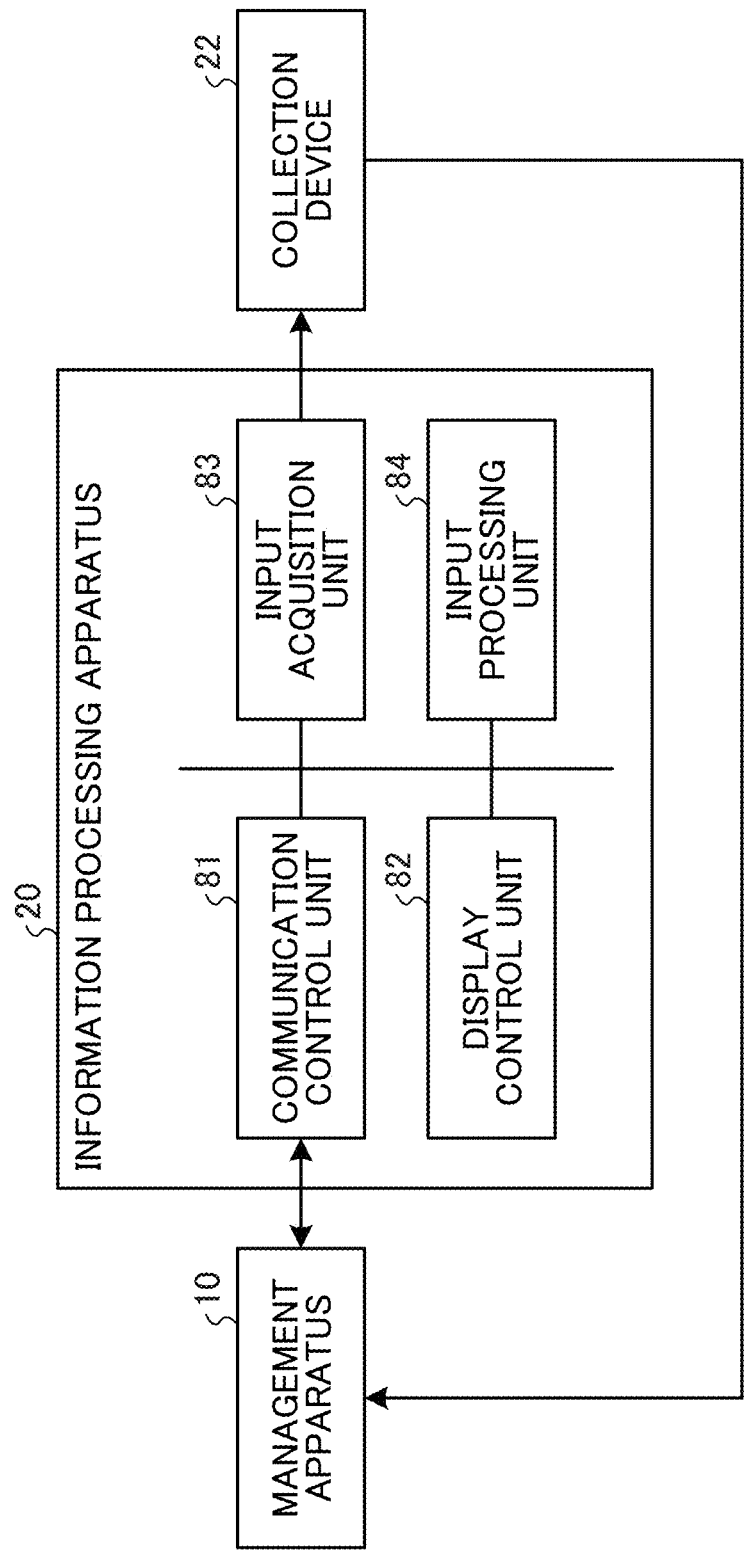

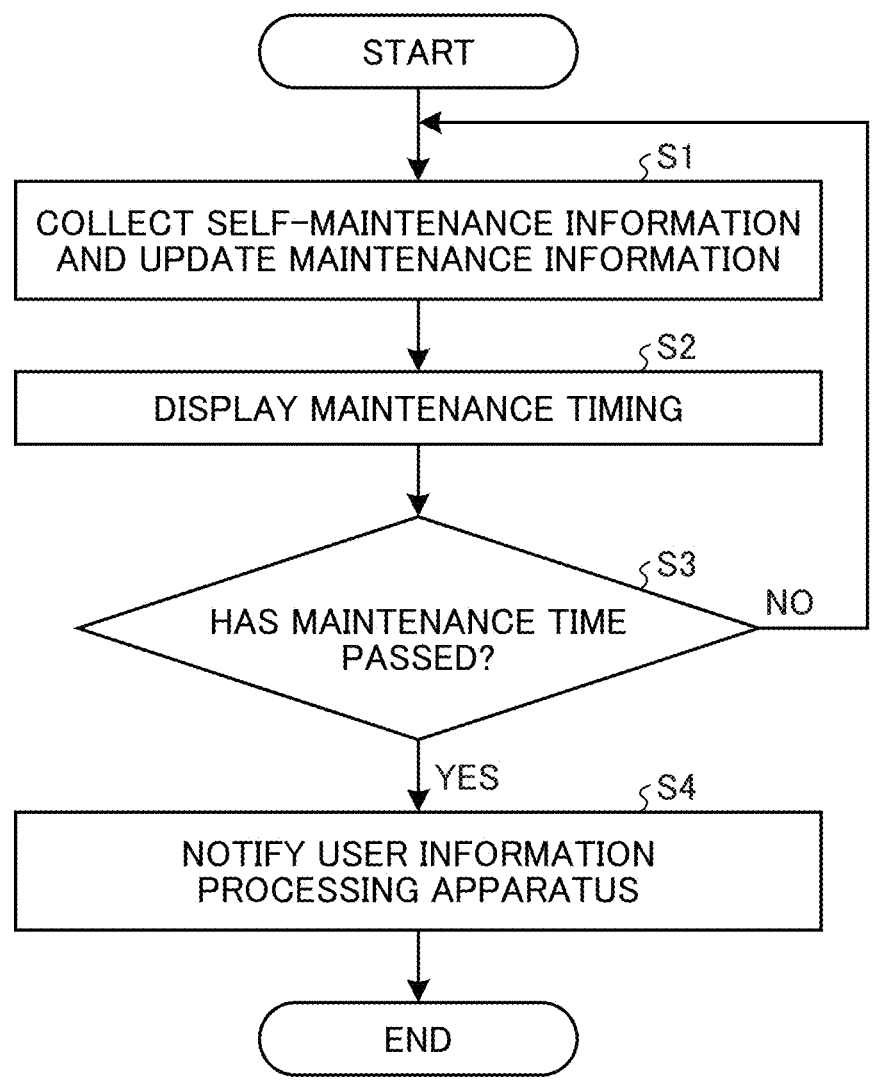

FIG. 9

| PRODUCT LOGO | | username | LOG OUT |

CUSTOMER LIST > MAINTENANCE ITEM MANAGEMENT > MAINTENANCE MANAGEMENT ITEM CHANGE

USER LIST
USER MANAGEMENT
EDGE DEVICE LIST
Data Collector LIST (DEVICE LIST)
INTERMEDIARY MODULE LIST (INTERMEDIARY DEVICE LIST)

MAINTENANCE MANAGEMENT ITEM CHANGE [RETURN]

CONTRACT NAME  SUPPORT CONTRACT A

PRODUCT NAME  ABC70

PM tasks

▼ ☐ Two Weeks

| CATEGORY | TASK NAME | TARGET |
|---|---|---|
| Clean | Nozzle plate PC | ☑ |
| Clean | Printhead caps PC | ☐ |

▼ ☐ Monthly

| CATEGORY | TASK NAME | TARGET |
|---|---|---|
| Clean | Certain transport rollers – printer | ☑ |
| Clean | Control unit | ☐ |
| Clean | DPP/DIS sensors | ☐ |
| Clean | Drum dryer – If air dryers are installed | ☐ |
| Clean | EPC sensor | ☐ |
| Clean | Nozzle plate K, C, M and Y (Printers with cap stamps) | ☑ |
| Clean | Printhead module bottom frame | ☐ |
| Clean | Web cleaner filter | ☑ |
| Clean | Wiper unit –while installed | ☑ |

▶ ☐ Two Months
▶ ☐ Six Months
▶ ☐ Yearly
▶ ☐ Two Year

[CHANGE]

FIG. 10

| PRODUCT LOGO | | | | | username | LOG OUT |

CUSTOMER LIST > EDGE DEVICE LIST > ABC70 > MAINTENANCE STATUS

| CUSTOMER LIST |
| USER MANAGEMENT |
| EDGE DEVICE LIST |
| Data Collector LIST (DEVICE LIST) |
| INTERMEDIARY MODULE LIST (INTERMEDIARY DEVICE LIST) |
| MAINTENANCE HISTORY |

MAINTENANCE STATUS

[RETURN]

SEARCH CONDITION: INTERVAL [▼] CATEGORY [▼]
TASK NAME [          ]   [SEARCH] [RESET]

NUMBER OF RESULTS: TWO ITEMS   [<<][1][2][3][4][5][>>]   NUMBER OF DISPLAYED ITEMS: [10 ▼]

| INTERVAL | CATEGORY | TASK NAME | PREVIOUS EXECUTION DATE | NEXT SCHEDULE |
|---|---|---|---|---|
| Daily | Clean | Automated printhead cleaning (including Protector Coat) | 02/28/2018 | 03/01/2018 |
| Monthly | Clean | Drum dryer -- If air dryers are instal | | |

△ RETURN TO TOP OF PAGE

FIG. 11

PRODUCT LOGO | username | LOG OUT

CUSTOMER LIST > EDGE DEVICE LIST > ABC70 > EDGE DEVICE SETTING

Sidebar:
- CUSTOMER LIST
- USER MANAGEMENT
- EDGE DEVICE LIST
- Data Collector LIST (DEVICE LIST)
- INTERMEDIARY MODULE LIST (INTERMEDIARY DEVICE LIST)

EDGE DEVICE SETTING [RETURN]

REGULAR LOG NOTIFICATION SETTING   * AT LEAST ONE DAY SHOULD BE SELECTED

NOTIFICATION DAY  ☑MON ☐TUE ☐WED ☐THU ☐FRI ☐SAT ☐SUN

NOTIFICATION TIME [00 ▼] : [00 ▼]

MAINTENANCE CONTRACT SELECTION [▼]

CUSTOMER ENGINEER PM TASK NOTIFICATION DESTINATION SETTING   * UP TO FIVE MAIL ADDRESSES CAN BE REGISTERED

MAIL ADDRESS [          ] [ADD]

| No | CUSTOMER ENGINEER PM TASK NOTIFICATION DESTINATION | |
|---|---|---|
| 1 | xxxxx@xxxx.com | CANCEL |
| 2 | xxxxx@xxxx.com | CANCEL |
| 3 | xxxxx@xxxx.com | CANCEL |
| 4 | xxxxx@xxxx.com | CANCEL |
| 5 | xxxxx@xxxx.com | CANCEL |

DEVICE OPERATOR PM TASK NOTIFICATION DESTINATION SETTING   * UP TO TEN MAIL ADDRESSES CAN BE REGISTERED

MAIL ADDRESS [          ] [ADD]

| No | DEVICE OPERATOR PM TASK NOTIFICATION DESTINATION | |
|---|---|---|
| 1 | xxxxx@xxxx.com | CANCEL |
| 2 | xxxxx@xxxx.com | CANCEL |
| 3 | xxxxx@xxxx.com | CANCEL |
| 4 | xxxxx@xxxx.com | CANCEL |
| 5 | xxxxx@xxxx.com | CANCEL |

[SAVE]

MAINTENANCE MANAGEMENT APPARATUS, MAINTENANCE MANAGEMENT SYSTEM, METHOD OF MANAGING MAINTENANCE, AND RECORDING MEDIUM

CROSS-REFERENCE TO RELATED APPLICATIONS

This patent application is based on and claims priority pursuant to 35 U.S.C. § 119(a) to Japanese Patent Application No. 2018-204428, filed on Oct. 30, 2018, in the Japan Patent Office, the entire disclosure of which is hereby incorporated by reference herein.

BACKGROUND

Technical Field

The present invention relates to a maintenance management apparatus, a maintenance management system, a method of managing maintenance, and a recording medium.

Discussion of the Background Art

An information processing apparatus disclosed in JP-2005-165467-A calculates an efficient maintenance schedule from a relationship between regular maintenance information determined in a long term and alarm information related to an alarm, and provides the maintenance schedule to a host device via a network. A serviceperson makes a maintenance visit at the time defined by the maintenance schedule provided by the information processing apparatus. As a result, maintenance visits of the serviceperson can be made efficiently.

However, in the case of the above-described information processing apparatus, although the regular maintenance schedule and the alarm information of the device are considered, maintenance or the like performed on the information processing apparatus by a user him/herself has not been considered. Therefore, there has been a disadvantage that, despite the fact that the device is maintained in good conditions by the maintenance, such as cleaning, being carried out by the user him/herself, the regular maintenance is to be carried out in a similar manner to a device not having been subject to such maintenance.

SUMMARY

Example embodiments of the present invention include a maintenance management apparatus for managing maintenance on one or more devices, including: circuitry to: obtain self-maintenance information indicating time at which self-maintenance has been performed on a device; obtain maintenance information indicating maintenance scheduled to be performed on the device from a memory, the maintenance information including time information indicating scheduled execution time of maintenance; update the time information indicating scheduled execution time of maintenance based on the self-maintenance information; and send a notification for prompting maintenance of the device when the time indicated by the time information having been updated is reached.

Example embodiments of the present invention include a maintenance management system including the above-described maintenance management apparatus, a method of managing maintenance, and a recording medium storing a program for managing maintenance.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 1A and 1B (FIG. 1) are a diagram schematically illustrating a system configuration of a maintenance management system according to a first embodiment;

FIG. 7 is a functional block diagram illustrating each function implemented by a CPU of the information processing apparatus of the customer operator executing a self-maintenance application program (AP);

FIG. 8 is a flowchart illustrating a flow of update of maintenance timing and notification operation in the management apparatus;

FIG. 9 is a diagram illustrating an exemplary screen of a maintenance management item change;

FIG. 10 is a diagram illustrating an exemplary screen of a maintenance status;

FIG. 11 is a diagram illustrating an exemplary display screen displayed on the basis of contact data indicating a contact address of each customer.

Figure 1B:
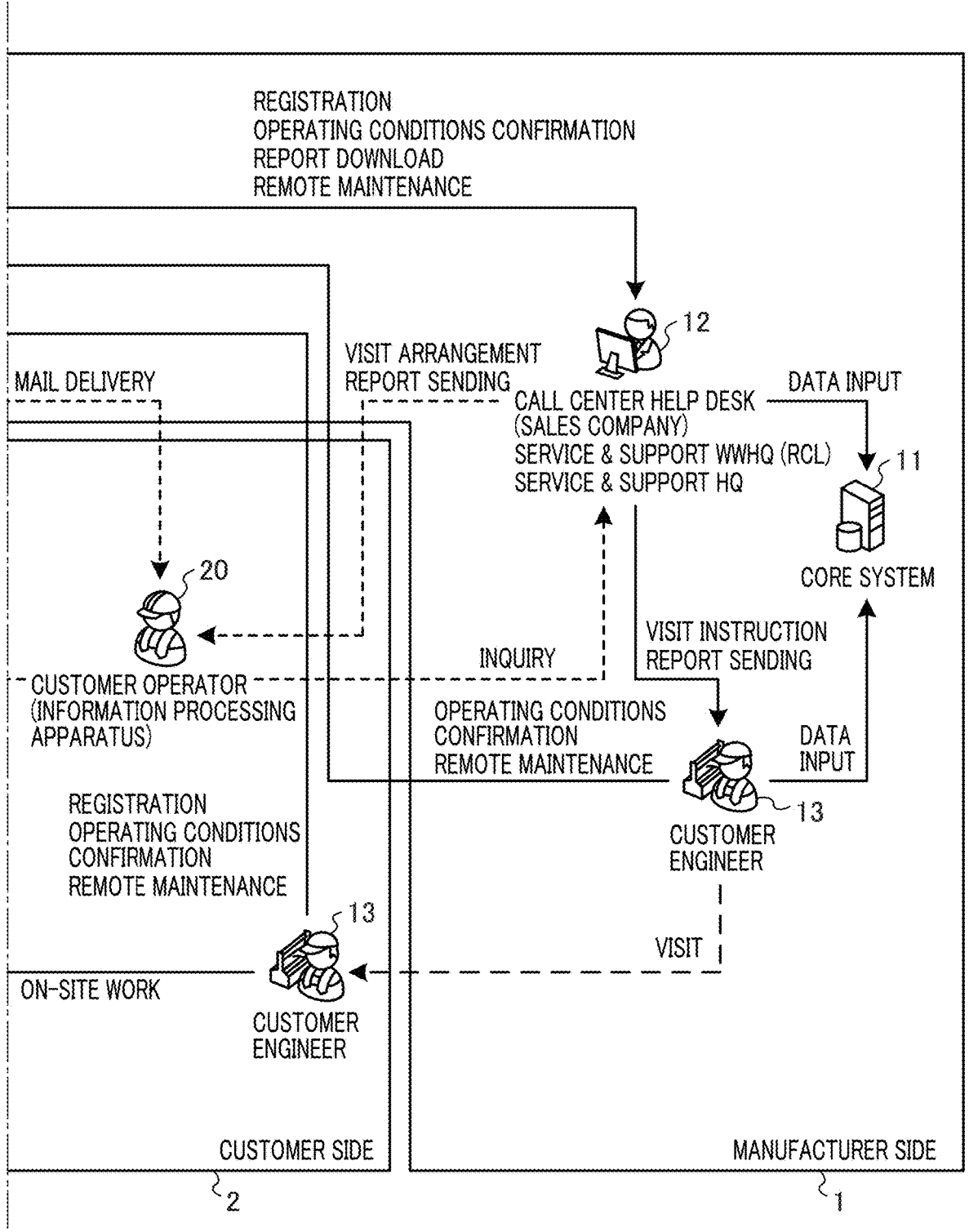

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of a maintenance management apparatus, a maintenance management system, a method of managing maintenance, and a maintenance management program, will be described with reference to the accompanying drawings.

System Configuration of Maintenance Management System

FIG. 1 is a diagram schematically illustrating a system configuration of a maintenance management system according to a first embodiment. As illustrated in FIG. 1, the maintenance management system includes a manufacturer-side system 1, and a customer-side system 2. The manufacturer-side system 1 and the customer-side system 2 are mutually connected via a public communication network, such as the Internet, and a private communication network, such as a local area network (LAN), for example.

Configuration of Manufacturer-Side System

The manufacturer-side system 1 is a system on the side of a manufacturer that manufactures and sells an image forming apparatus 25 (exemplary device) provided in the customer-side system 2. The manufacturer-side system 1 includes a management apparatus 10 (example of maintenance management apparatus), a core system 11, a terminal device 12 of a person in charge of help desk in a call center, a terminal device 13 of a customer engineer, and an operating conditions collection device 14 that collects data indicating operating conditions of the image forming apparatus 25.

As will be described later, the management apparatus 10 collects self-maintenance information indicating maintenance performed on the image forming apparatus 25 by a customer. Further, the management apparatus 10 collects, from the customer side, usage amount information indicating a "usage amount" of the image forming apparatus 25, such as operating time, the number of printed sheets, and a remaining amount of toner.

Further, the management apparatus 10 performs, for example, a setting change, log acquisition, notification of a task alert, update processing of firmware of the image forming apparatus 25, and the like. Further, the management apparatus 10 transmits maintenance information to the customer-side system 2 at a timing corrected (updated) on the basis of at least one of self-maintenance information collected from the customer-side system 2 and usage amount information so that maintenance of the image forming apparatus 25 is urged.

The core system 11 manages the respective units included in the manufacturer-side system 1, such as the management apparatus 10 and the terminal device 13 of a customer engineer (manages the entire system). The terminal device 12 of the person in charge of help desk in a call center provides services, support, and the like in response to an inquiry from a customer.

The terminal device 13 of a customer engineer performs remote maintenance for a customer, such as confirmation of operating conditions of the image forming apparatus 25, a setting change, log acquisition, notification of a task alert, update processing of firmware of the image forming apparatus 25, and the like. Further, a customer engineer visits a customer to perform, using the terminal device 13, registration, confirmation of operating conditions, remote maintenance, and predetermined on-site work.

The operating conditions collection device 14 for collecting data indicating operating conditions of the image forming apparatus 25 monitors the operating conditions of the image forming apparatus 25 on the basis of various data collected from the image forming apparatus 25, confirmation data of the operating conditions of the image forming apparatus 25 transmitted from a terminal device 23 of a customer-side administrator, and the like.

Configuration of Customer-Side System

The customer-side system 2 includes an information processing apparatus 20 of an operator on the customer side, a collection device 22, the terminal device 23 of a customer-side administrator, an operating conditions monitoring device 24, and one or more image forming apparatuses 25 provided from the manufacturer.

As the information processing apparatus 20 of an operator on the customer side, for example, a portable device, such as a smartphone and a laptop personal computer, can be used in addition to a desktop personal computer. The operator on the customer side installs, in the information processing apparatus 20, a self-maintenance application program (self-maintenance AP) 21 provided from the management apparatus 10 on the manufacturer side. Then, the operator on the customer side activates the self-maintenance AP 21, and performs input operation to declare the self-maintenance performed on the image forming apparatus 25 at the customer's end.

As the image forming apparatus 25, for example, a printer, a scanner, a multifunction peripheral having a plurality of image forming functions, or the like can be used. The image forming apparatus 25 includes a digital front end (DFE) controller 26, and an engine 27. The engine 27 controls printing on a predetermined print medium. The DFE controller 26 transmits, to the collection device 22, the self-maintenance information input on the basis of the self-maintenance AP 21, and the usage amount information indicating the "usage amount", which is collected from the engine 27, such as the operating time, the number of printed sheets, and the remaining amount of toner of the image forming apparatus 25.

Note that, although the DFE controller 26 is provided in the image forming apparatus 25 in the example of FIG. 1, the DFE controller 26 may be provided outside the image forming apparatus 25. That is, the image forming apparatus 25 and the DFE controller 26 may be separate devices.

The collection device 22 collects self-maintenance information indicating self-maintenance input by the operator on the customer side via the information processing apparatus 20, and usage amount information indicating the "usage amount", such as the operating time, the number of printed sheets, and the remaining amount of toner, and transmits the information to the management apparatus 10 on the manufacturer side. The administrator on the customer side supplies operating conditions confirmation data, which indicates the operating conditions of the image forming apparatus 25, to the operating conditions monitoring device 24 via the terminal device 23, or transmits it to the operating conditions collection device 14 on the manufacturer side. The operating conditions monitoring device 24 collects various data from the image forming apparatus 25 and the terminal device 23 of the administrator, monitors the operating conditions of the image forming apparatus 25, and transmits operating conditions confirmation data to the operating conditions collection device 14 on the manufacturer side.

Note that, while description is made assuming that the self-maintenance AP is installed in the information processing apparatus 20 of the operator on the customer side and self-maintenance information is input in the example of FIG. 1, the self-maintenance AP may be installed in the image forming apparatus 25, and the operation device of the image forming apparatus 25 may be operated to input self-maintenance information. Alternatively, the self-maintenance AP may be installed in the DFE controller that is a device separate from the image forming apparatus 25, and the operation device of the DFE controller may be operated to input self-maintenance information.

Hardware Configuration of Management Apparatus

Figure 2:
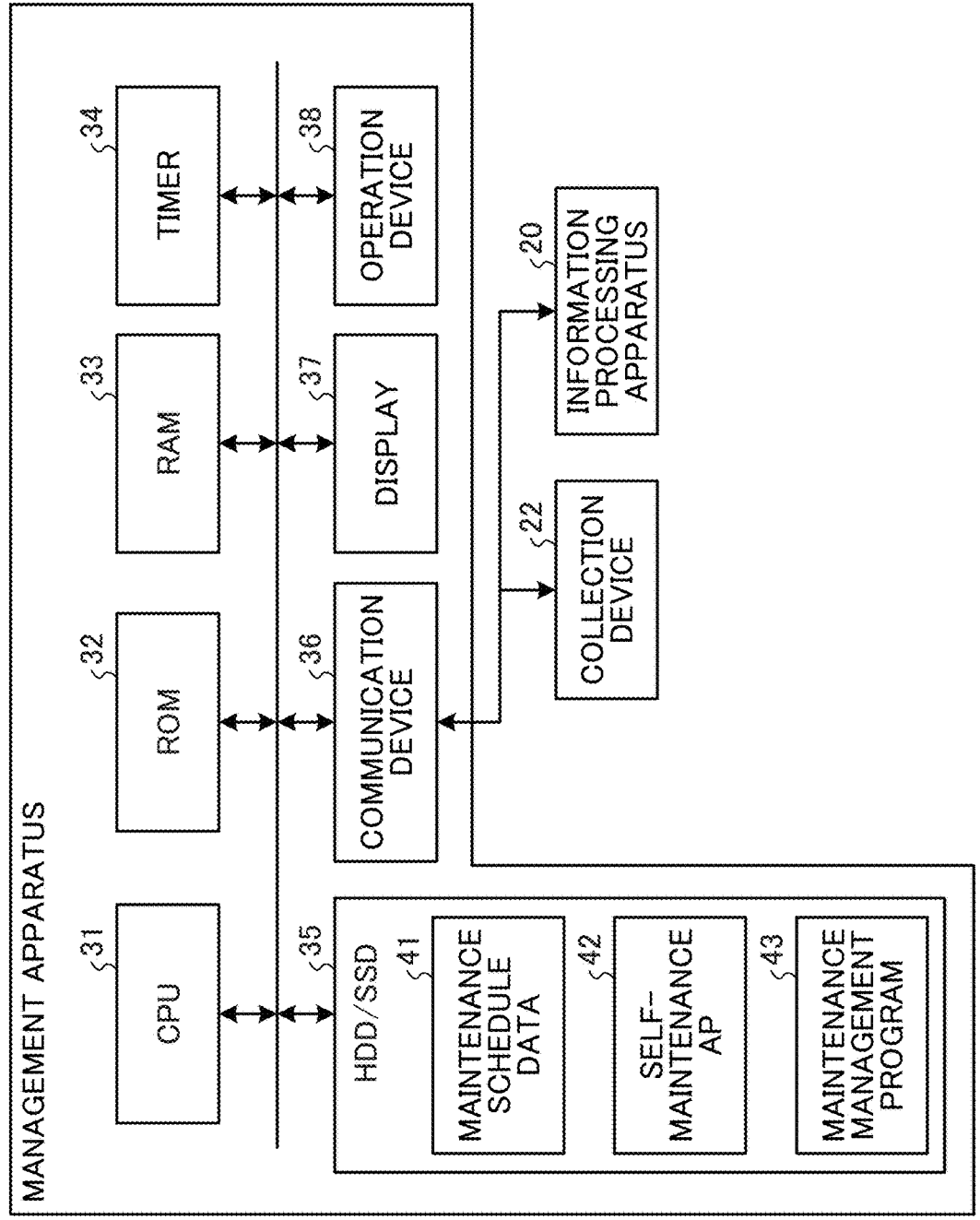
FIG. 2 is a hardware configuration diagram of a management apparatus.

FIG. 2 is a hardware configuration diagram of the management apparatus 16. As illustrated in FIG. 2, the management apparatus 10 includes a CPU 31, a read-only memory (ROM) 32, a random access memory (RAM) 33, a timer 34, a memory 35, a communication device 36, a display 37, and an operation device 38.

The CPU 31 controls the overall operation of the management apparatus 10. The ROM 32 stores an operating system (OS) and the like. For example, the CPU 31 develops each function of a maintenance management program in the RAM 33. The CPU 31 executes each function developed in the RAM 33 in accordance with maintenance management. The timer 34 clocks time such as hours, minutes, and seconds. The CPU 31 controls maintenance timing of the image forming apparatus 25 on the basis of the timing information clocked by the timer 34, and makes notification prompting maintenance.

For example, a magnetic storage device, such as a hard disk drive (HDD), an optical storage device, or a semiconductor storage device, such as a solid state drive (SSD), can be used as the memory 35. The memory 35 stores maintenance schedule data 41 indicating a maintenance schedule of the image forming apparatus 25. Further, the memory 35 stores a self-maintenance AP 42 to be installed in the information processing apparatus 20 of the operator on the customer side, the image forming apparatus 25, or the DFE controller that is a device separate from the image forming apparatus 25. Furthermore, the memory 35 stores a maintenance management program 43 for managing the maintenance of the image forming apparatus 25. The CPU 31 manages the maintenance of the image forming apparatus 25 by executing the maintenance management program 43 as will be described later.

The communication device 36 performs wired communication or wireless communication via a network between the collection device 22 on the customer side and the information processing apparatus 20 operated by the customer operator. The display 37 displays, as will be described later, a date on which the maintenance of each image forming apparatus 25 has been carried out, an interval for carrying out maintenance, a next schedule for carrying out maintenance, a scheduled date of the next maintenance, and the like. The operation device 38 is operated in the case where, for example, the administrator or the like on the manufacturer side inputs settings related to maintenance.

Hardware Configuration of Information Processing Apparatus

Figure 3:
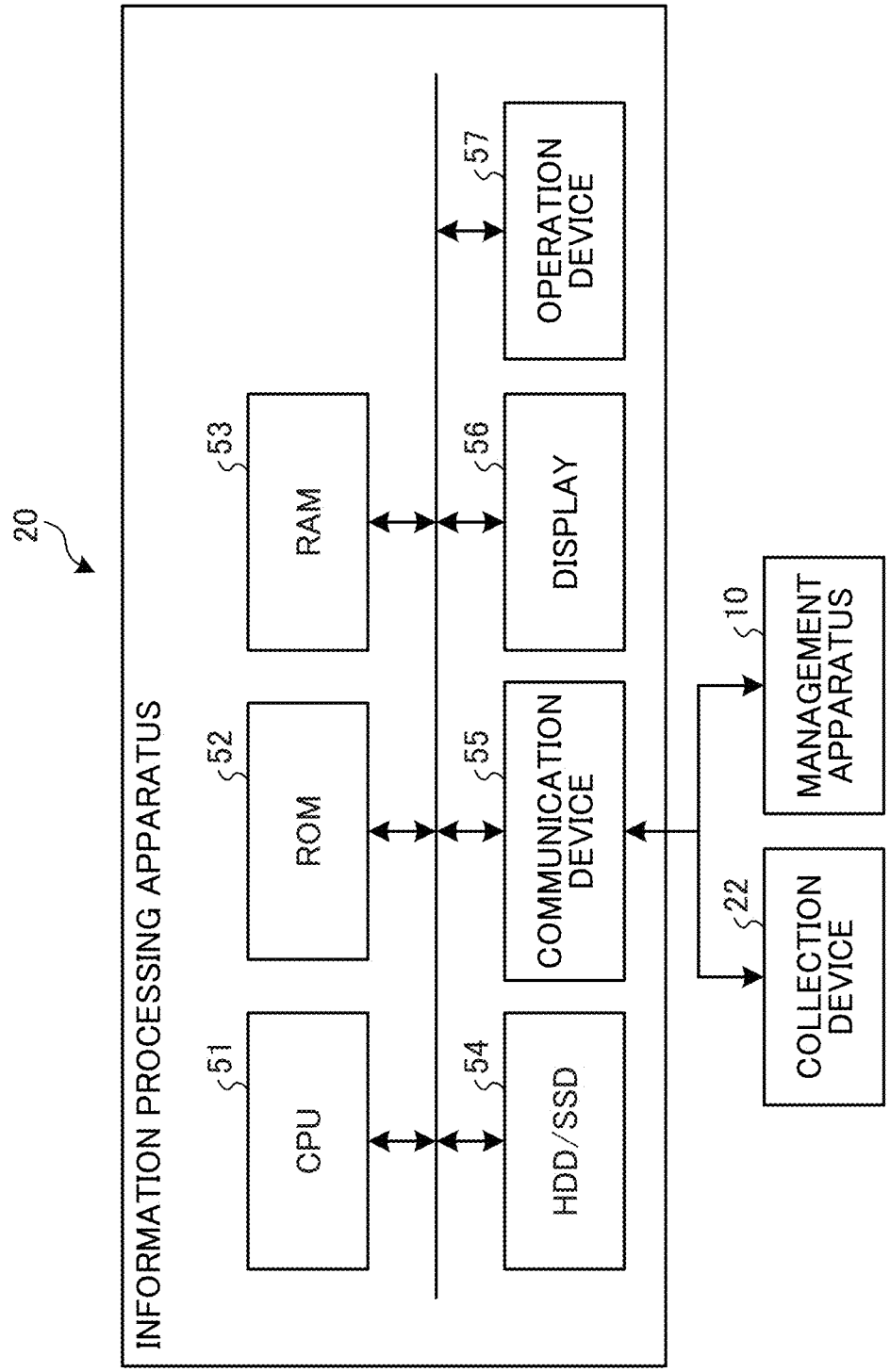
FIG. 3 is a diagram illustrating a hardware configuration of an information processing apparatus operated by an operator or the like on a customer side.

FIG. 3 is a diagram illustrating a hardware configuration of the information processing apparatus 20 operated by the operator or the like on the customer side. As illustrated in FIG. 3, the information processing apparatus 20 includes a CPU 51, a ROM 52, a RAM 53, a memory 54, a communication device 55, a display 56, and an operation device 57.

The CPU 51 controls the overall operation of the information processing apparatus 20. The ROM 52 stores an operating system (OS) and the like. The CPU 51 develops each function of the self-maintenance AP 42 in the RAM 53.

For example, a magnetic storage device, such as an HDD, an optical storage device, or a semiconductor storage device, such as an SSD, can be used as the memory 54. The memory 35 stores the self-maintenance AP 42 and the like downloaded from the management apparatus 10. As will be described later, the CPU 51 develops and executes each function of the self-maintenance AP 42 in the RAM 53, thereby performing information processing of the self-maintenance information according to input operation.

The communication device 55 performs wired communication or wireless communication via a network between the collection device 22 on the customer side and the management apparatus 10 on the manufacturer side. The display 56 displays an input screen of the self-maintenance information or the like on the basis of the self-maintenance AP 42. In addition, the display 56 displays maintenance notification prompting maintenance of the image forming apparatus 25 notified from the management apparatus 10. The operation device 57 is operated at the time of, for example, inputting self-maintenance information.

Hardware Configuration of Collection Device

Figure 4:
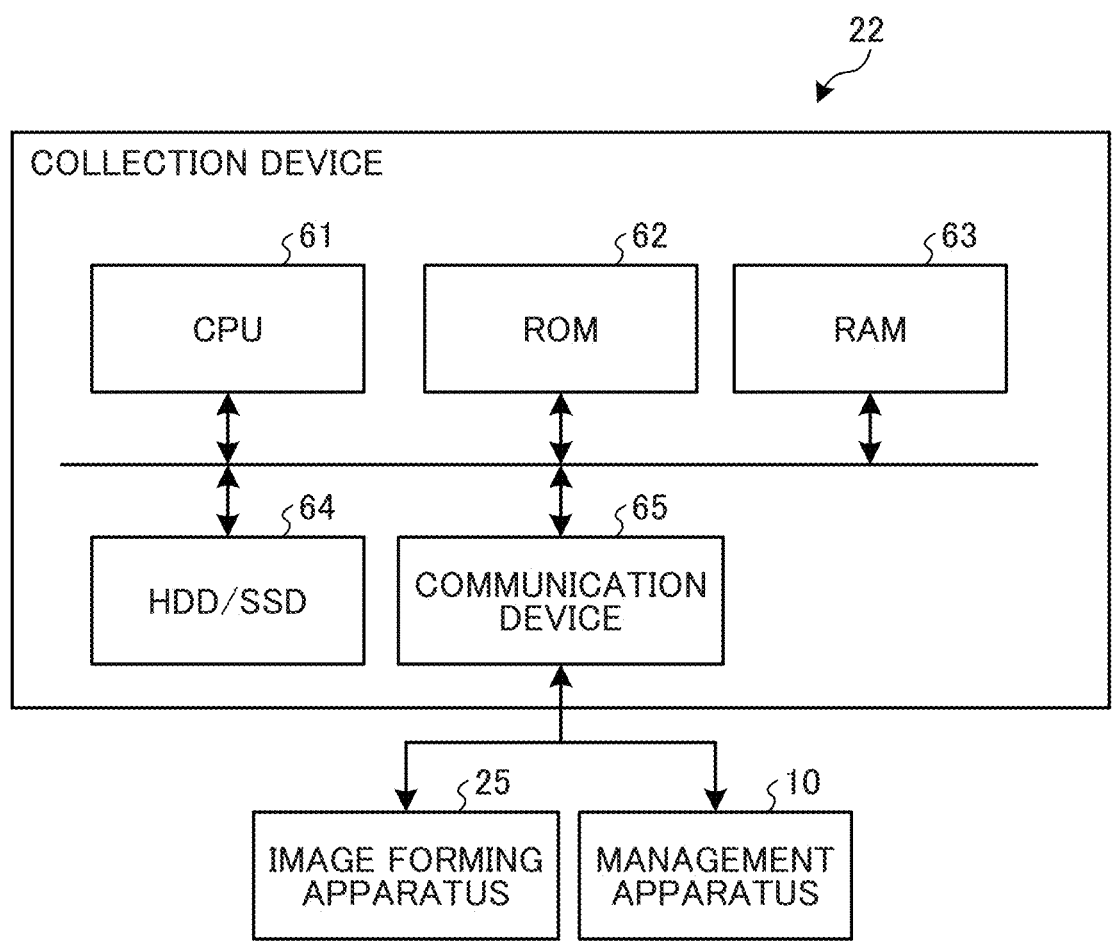
FIG. 4 is a diagram illustrating a hardware configuration of a collection device on the customer side.

FIG. 4 is a diagram illustrating a hardware configuration of the collection device 22 on the customer side. As illustrated in FIG. 4, the collection device 22 includes a CPU 61, a ROM 62, a RAM 63, a memory 64, and a communication device 65.

The CPU 61 controls the overall operation of the collection device 22. The ROM 62 stores an operating system (OS) and the like. The CPU 61 develops each function of a data collection program in the RAM 63.

For example, a magnetic storage device, such as an HDD, an optical storage device, or a semiconductor storage device, such as an SSD, can be used as the memory 64. The memory 64 stores the usage amount information indicating the "usage amount" of the image forming apparatus 25, such as the operating time, the number of printed sheets, and the remaining amount of toner, which is collected from the image forming apparatus 25, the self-maintenance information collected from the information processing apparatus 20 of the customer operator, and the like. The CPU 61 develops and executes each function of a data collection program in the RAM 53 to collect the usage amount information and the self-maintenance information, and transmits the information to the management apparatus 10. The communication device 65 performs wired communication or wireless communication via a network between the image forming apparatus 25 on the customer side and the management apparatus 10 on the manufacturer side.

Functional Configuration of Management Apparatus

Figure 5:
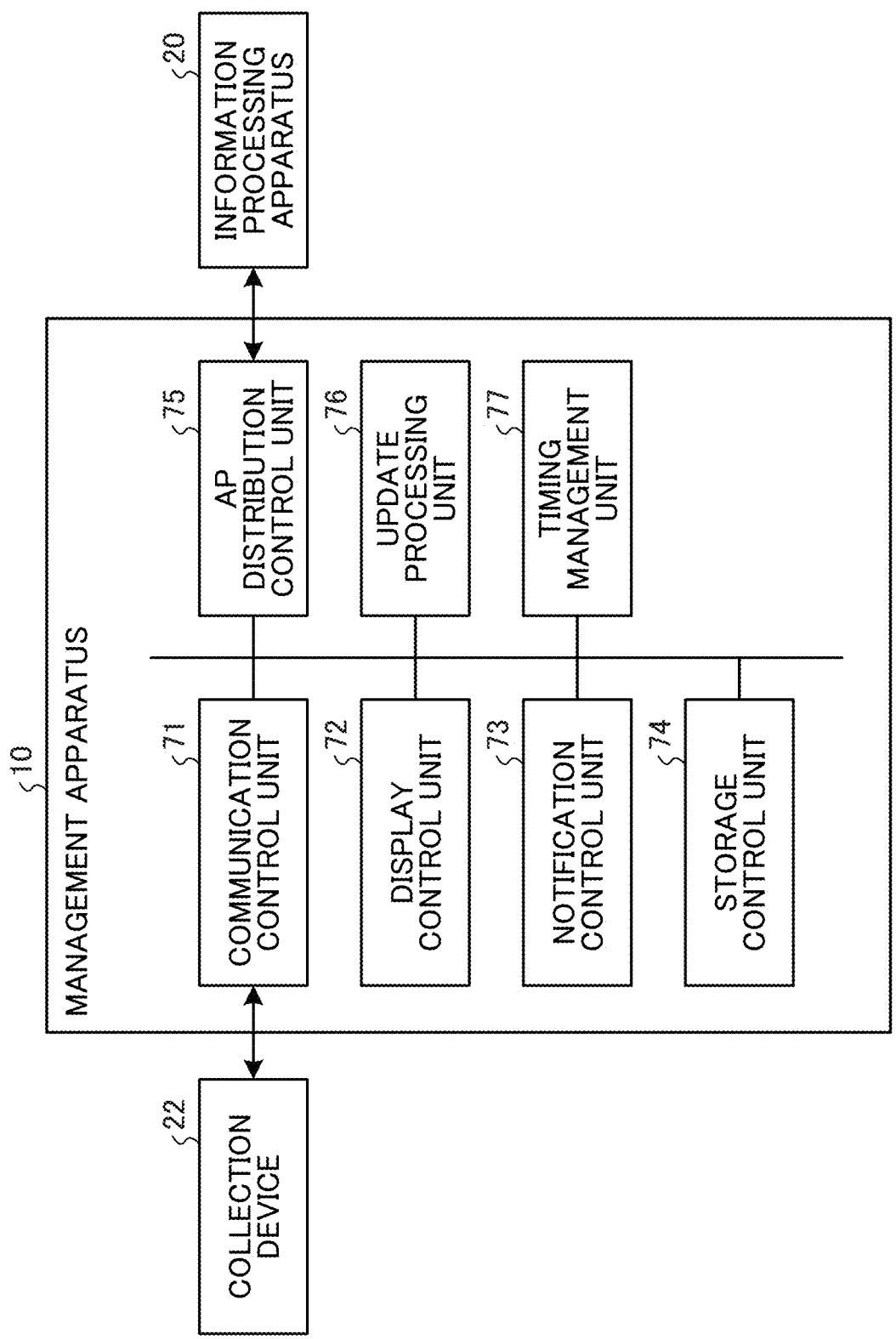
FIG. 5 is a functional block diagram illustrating each function implemented by a central processing unit (CPU) of the management apparatus executing a maintenance management program.

FIG. 5 is a functional block diagram illustrating each function implemented by the CPU 31 of the management apparatus 10 executing a maintenance management program. As illustrated in FIG. 5, the maintenance management program implements a communication control unit 71, a display control unit 72, a notification control unit 73, a storage control unit 74, an AP distribution control unit 75, an update processing unit 76, and a timing management unit 77.

The communication control unit 71 is an exemplary acquisition control unit, and controls wired communication or wireless communication with the collection device 22 on the customer side and with the information processing apparatus 20 of the customer operator, which is performed via the communication device 36. Specifically, the communication control unit 71 obtains, from the collection device 22, the self-maintenance information input by the customer operator and the usage amount information collected from the image forming apparatus 25, and controls the information.

The display control unit 72 causes the display 37 to display and control a date on which the maintenance of each image forming apparatus 25 has been carried out, an interval for carrying out maintenance, a next schedule for carrying out maintenance, a scheduled date of the next maintenance, and the like.

The notification control unit 73 makes maintenance notification directed to the information processing apparatus 20 of the customer operator and the like at a timing when maintenance of the image forming apparatus 25 is carried out. The storage control unit 74 stores and controls, in the memory 35, the maintenance schedule data 41 indicating a maintenance schedule of each image forming apparatus 25.

The AP distribution control unit 75 distributes and controls the self-maintenance AP 42 for inputting self-maintenance to the information processing apparatus 20 of the customer operator, the image forming apparatus 25, and the like. The update processing unit 76 corrects updates) the maintenance schedule data stored in the memory 35 on the basis of at least one of the self-maintenance information obtained from the collection device 22 and the usage amount information, and updates the maintenance timing of the image forming apparatus 25.

The timing management unit 77 monitors the maintenance timing indicated by the maintenance schedule data on the basis of the timing information clocked by the timer 34, and makes notification indicating that it is the maintenance timing to the notification control unit 73 when the maintenance timing is reached. When notification from the timing management unit 77 is received, the notification control unit 73 makes maintenance notification for prompting maintenance to the information processing apparatus 20 of the customer operator and the like.

Note that, although the communication control unit 71 to the timing management unit 77 are implemented by software in this example, a part of or all of the units may be implemented by hardware, such as an integrated circuit (IC). In addition, the functions implemented by the communication control unit 71 to the timing management unit 77 may be implemented by the maintenance management program alone, or the processing may be indirectly executed by another program partially executing the processing or using other programs. The same applies to other programs in the present embodiment.

Further, the maintenance management program may be provided as a file in an installable format or an executable format, which is recorded in a computer-readable recording medium, such as a compact disc read-only memory (CD-ROM) and a flexible disk (FD). Further, the maintenance management program may be provided in a manner recorded in a computer-readable recording medium, such as a compact disc-recordable (CD-R), a digital versatile disk (DVD), a Blu-ray Disc (registered trademark), and a semiconductor memory. Further, the maintenance management program may be provided in the form of being installed via a network, such as the Internet, or may be provided by being incorporated in advance in a ROM or the like in the device. The same applies to other programs in the present embodiment.

Functional Configuration of Collection Device

Figure 6:
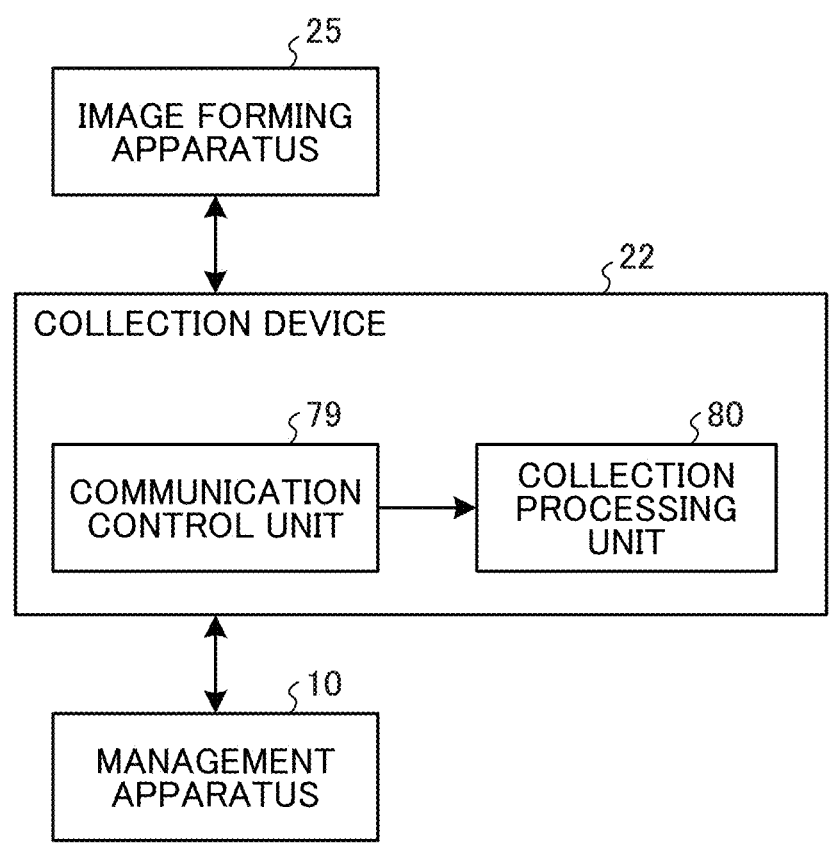
FIG. 6 is a functional block diagram illustrating each function implemented by a CPU of the collection device executing a data collection program.

FIG. 6 is a functional block diagram illustrating each function implemented by the CPU 61 of the collection device 22 executing a data collection program. As illustrated in FIG. 6, a communication control unit 79 and a collection processing unit 80 are implemented by the data collection program.

The collection processing unit 80 collects the self-maintenance information from the information processing apparatus 20 of the customer operator, and the usage amount information from the image forming apparatus 25. The communication control unit 79 obtains the self-maintenance information and the usage amount information, and transmits and controls the obtained self-maintenance information and the usage amount information to the management apparatus 10 via the communication device 65.

Functional Configuration of Information Processing Apparatus

FIG. 7 is a functional block diagram illustrating each function implemented by the CPU 51 of the information processing apparatus 20 of the customer operator executing a self-maintenance AP. As illustrated in FIG. 7, a communication control unit 81, a display control unit 82, an input acquisition unit 83, and an input processing unit 84 are implemented by the self-maintenance AP.

The communication control unit 81 controls the communication device 55 to perform wired communication or wireless communication via a network with the management apparatus 10 and with the collection device 22. The display control unit 82 causes the display 56 to display and control an input screen or the like for inputting information associated with the self-maintenance performed on the image forming apparatus 25.

The input acquisition unit 83 obtains information associated with the self-maintenance input through the input screen. The input processing unit 84 forms self-maintenance information indicating the self-maintenance performed on the image forming apparatus 25 on the basis of the information associated with the self-maintenance input through the input screen. The formed self-maintenance information is collected by the collection device 22, and is transmitted to the management apparatus 10.

Update Operation of Maintenance Timing

The management apparatus 10 of such a maintenance management system corrects (updates) the maintenance timing of one or more image forming apparatuses 25 stored and managed in advance in the memory 35 according to the self-maintenance or the like performed on the image forming apparatus 25 at the customer's end. Then, the management apparatus 10 makes notification for prompting the corresponding image forming apparatus 25 to carry out maintenance at the updated maintenance timing.

FIG. 8 is a flowchart illustrating a flow of update of maintenance timing and notification operation in such a management apparatus 10. The flowchart starts when the CPU 31 of the management apparatus 10 reads the maintenance management program 43 stored in the memory 35 and develops each function illustrated in FIG. 5 in the RAM 33 to be executable.

In step S1, the communication control unit 71 collects, from the collection device 22 on the customer side, self-maintenance information indicating content of the self-maintenance performed on each image forming apparatus 25 at the customer's end. Note that the collection device 22 collects, from each image forming apparatus 25, usage amount information indicating the "usage amount", such as the operating time, the number of printed sheets, and the remaining amount of toner. The collection device 22 includes the usage amount information in the self-maintenance information and transmits it to the management apparatus 10.

When the self-maintenance information is collected, the administrator on the manufacturer side is notified of the fact that the self-maintenance information has been obtained. The administrator on the manufacturer side recognizes the content of the self-maintenance performed on the image forming apparatus 25 on the basis of the collected self-maintenance information. Then, the administrator on the manufacturer side operates the operation device 38 to designate the display of a screen of a change of the customer maintenance information in which the self-maintenance is performed (screen of a maintenance management item change).

When such display designation is made, the display control unit 72 causes the display 37 to display and control, for example, a screen of a maintenance management item change exemplified in FIG. 9. As an example, the screen of a maintenance management item change displays a contract name, a product name, a maintenance interval, a maintenance category, a task name, and the like. FIG. 9 is an example of a contract in which the contract name is "support contract A", the product name is "ABC70", and the maintenance interval is for cleaning a nozzle plate every two weeks and cleaning transport rollers, nozzle plates, a filter, and a wiper unit every month.

Furthermore, FIG. 10 is an exemplary display screen of a maintenance status (exemplary execution status) displayed on the display 37 by the display control unit 72 on the basis of the self-maintenance information collected from the customer side. FIG. 10 is an exemplary case where maintenance intervals, categories, task names, a previous execution date, and a scheduled date of next execution (next schedule: exemplary timing information) determined in advance on the basis of the contract mentioned above are displayed as a maintenance status screen. Specifically, the example of FIG. 10 illustrates that automated daily cleaning of a printhead is performed on Feb. 28, 2018, and the next execution is Mar. 1, 2018. In addition, the example of FIG. 10 illustrates that, in the case of being provided with an air dryer, drying and cleaning of a drum is performed monthly. Note that the intervals such as daily and monthly are examples of execution interval information.

The administrator on the manufacturer side corrects (updates) the self-maintenance information on the screen of a maintenance management item change illustrated in FIG. 9 on the basis of the usage amount information and the self-maintenance information collected from the customer side. Specifically, the administrator on the manufacturer side operates to update the self-maintenance information at the time, date, or interval determined on the basis of the execution date of the self-maintenance, and operates a "change" button illustrated in FIG. 9.

Alternatively, the administrator on the manufacturer side operates to update the self-maintenance information at the time, date, or interval determined on the basis of the installation date of the image forming apparatus 25, and operates the "change" button illustrated in FIG. 9. Alternatively, the administrator on the manufacturer side operates to update the self-maintenance information at the time, date, or interval determined on the basis of the usage amount of the image forming apparatus 25 indicated by usage amount information, and operates the "change" button illustrated in FIG. 9.

When the operation of the "change" button is detected, the update processing unit 76 updates the maintenance information stored in the memory 35 to the time, date, or interval determined on the basis of the execution date of the self-maintenance, the installation date of the image forming apparatus 25, or the usage amount of the image forming apparatus 25. The foregoing has described step S1.

Next, in step S2, the administrator operates the operation device 38 to designate the display of the maintenance timing of each image forming apparatus 25 having been updated. When the designation is made, the display control unit 72 displays, on the display 37, the maintenance interval, the content of the performed maintenance, the execution date of the maintenance, and the next execution date of each image forming apparatus 25. In step S3, the timing management unit 77 determines whether or not the maintenance time for the image forming apparatus 25 has passed on the basis of the execution date of the maintenance (step S3). If the timing management unit 77 determines that the maintenance time has not passed (No in step S3), the process returns to step S1, and if it is determined that the maintenance time has passed (Yes in step S3), the process proceeds to step S4. When it is determined that the maintenance time has passed, the timing management unit 77 transmits notification indicating the fact to the notification control unit 73.

In step S4, as the maintenance time has passed, the notification control unit 73 transmits an email (exemplary maintenance reminder notification) prompting maintenance to a contact address of a customer with the maintenance time having passed, and the process of the flowchart of FIG. 8 is terminated.

Specifically, FIG. 11 is an example of the display screen displayed on the basis of contact data indicating a contact address of each customer included in the maintenance schedule data 41. As illustrated in FIG. 11, the maintenance schedule data 41 includes, for example, an email address of each customer as contact data. The notification control unit 73 automatically creates an email prompting maintenance, and sends an email to the email address indicated by the contact data.

The example of FIG. 1 illustrates an exemplary case where the notification control unit 73 sends an email prompting maintenance to the terminal device 23 of the administrator on the customer side and the information processing apparatus 20 of the customer operator. The customer who has received the email carries out maintenance of the image forming apparatus 25.

As apparent from the descriptions above, the maintenance management system according to the first embodiment collects the self-maintenance information indicating the self-maintenance operation performed on each image forming apparatus 25 by the customer. Then, the scheduled maintenance schedule is corrected (updated) according to the self-maintenance operation performed by the customer.

Accordingly, it becomes possible to notify the customer of the timing of self-maintenance on the basis of the corrected maintenance schedule. As a result, the inconvenience of executing unnecessary maintenance or redundantly executing maintenance can be obviated.

Second Embodiment

Next, a maintenance management system according to a second embodiment will be described. The first embodiment described above is an example of making maintenance reminder notification in the case where the execution date of maintenance has passed. Meanwhile, the maintenance management system according to the second embodiment is an example of making maintenance reminder notification prompting execution of maintenance at a timing that is a predetermined period of time of before the time, date, period, and the like of maintenance to be performed. Note that only this point is different between the first embodiment described above and the second embodiment to be described below. In view of the above, only the difference between the two will be described hereinafter, and duplicate descriptions will be omitted.

Figure 12:
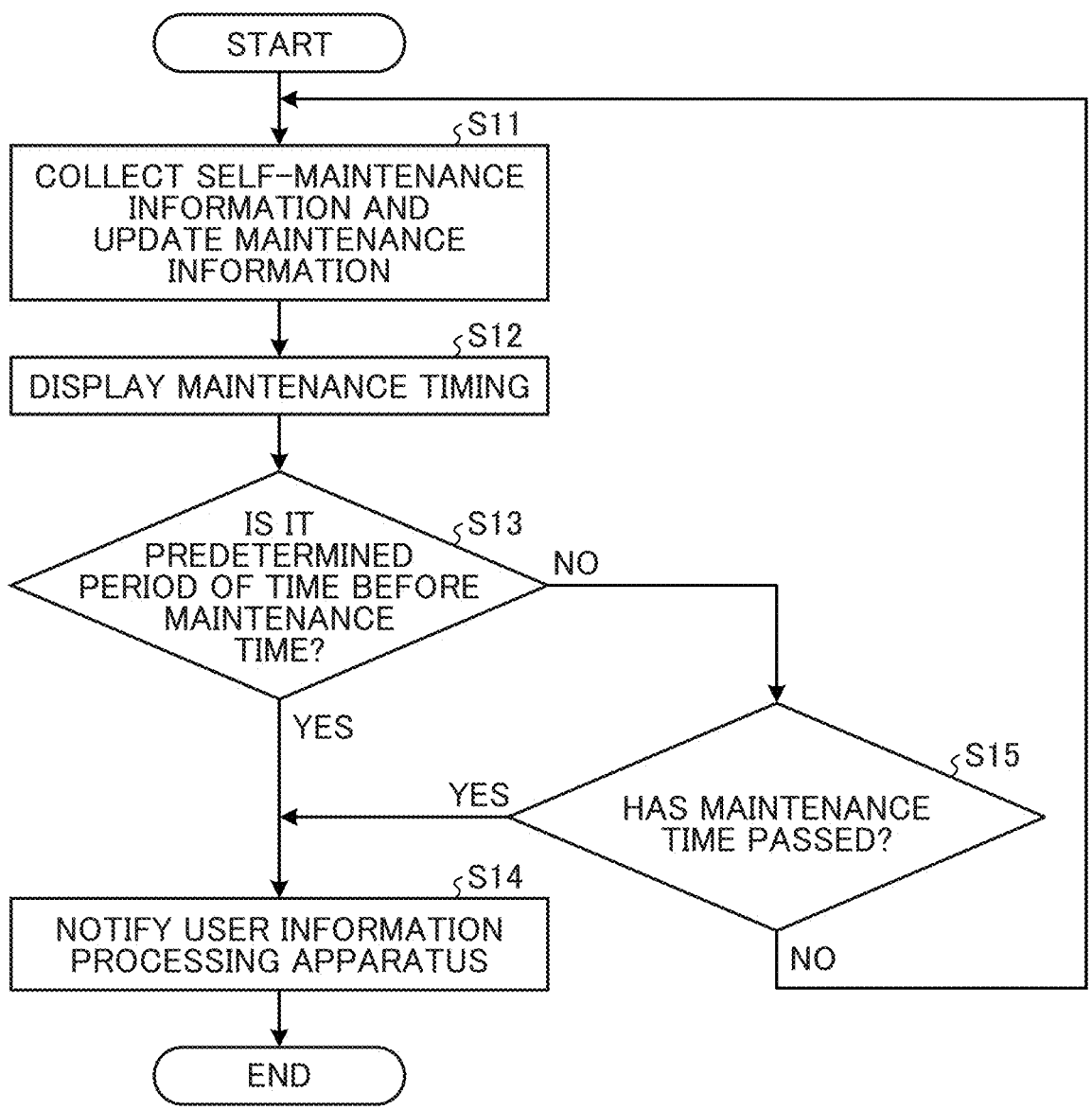
FIG. 12 is a flowchart illustrating a flow of update of maintenance timing and notification operation in a management apparatus according to a second embodiment.

FIG. 12 is a flowchart illustrating a flow of update of maintenance timing and notification operation in a management apparatus 10 according to the second embodiment. The flowchart starts when the CPU 31 of the management apparatus 10 reads the maintenance management program 43 stored in the memory 35 and develops each function illustrated in FIG. 5 in the RAM 33 to be executable.

The operation of steps S11 and S12 corresponds to the operation of steps S1 and S2 in the flowchart of FIG. 8. That is, an update processing unit 76 updates maintenance schedule data 41 stored in the memory 35 on the basis of self-maintenance information collected from the customer side. Accordingly, the process proceeds to step S13.

In step S13, a timing management unit 77 determines whether or not it is time that is a predetermined period of time before the maintenance timing, such as the updated time, date, and period, and self-maintenance information indicating that the scheduled maintenance has been carried out has been received at the current time. That is, the timing management unit 77 determines whether or not the self-maintenance information indicating that the scheduled maintenance has been carried out has been received by the time that is a predetermined period of time before the maintenance execution timing.

If the self-maintenance information indicating that the scheduled maintenance has been carried out has not been received despite the fact that it is the time before the predetermined period of time (Yes in step S13), a notification control unit 73 makes maintenance reminder notification in step S14, and the process of the flowchart of FIG. 12 is terminated.

On the other hand, if the time before the predetermined period of time has not come (No in step S13), the timing management unit 77 determines whether the maintenance time has passed in step S15. If the maintenance time has not passed (No in step S15), the process returns to step S11. If the maintenance time has passed (Yes in step S15), the notification control unit 73 makes the maintenance reminder notification in step S14, and the process of the flowchart of FIG. 12 is terminated.

As described above, the maintenance reminder notification is made at the timing that is the predetermined period of time before the scheduled maintenance execution timing. As a result, it becomes possible to prompt execution of maintenance well in advance before the maintenance execution timing, and effects similar to the effects in the first embodiment can be obtained.

According to one embodiment, a display device includes an acquisition control unit that obtains and controls, through an acquisition unit, self-maintenance information including date information indicating a date on which self-maintenance has been performed on a device, and a display control unit that causes a display to display the date on which the self-maintenance has been performed on the device on the basis of the date information included in the self-maintenance information obtained through the acquisition unit. In one example, the display device includes a memory that stores maintenance information including interval information indicating an interval of maintenance to be performed on the device, and the display control unit causes the display to display the interval of maintenance to be performed on the device. In one example, the maintenance information stored in the memory includes next execution date information indicating a date of the next maintenance to be performed on the device, and the display control unit causes the display to display the date of the next maintenance to be performed on the device on the basis of the next execution date information. In one example, there is provided an update processing unit that updates the next execution date information on the basis of the obtained self-maintenance information in such a manner that a schedule of the next maintenance to be performed on the device is updated.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A maintenance management apparatus for managing maintenance on one or more devices, the maintenance management apparatus comprising:
 processing circuitry configured to cause the maintenance management apparatus to,
  obtain self-maintenance information from a user via an input screen indicating a time at which self-maintenance has been performed on a device of the one or more devices by the user, the self-maintenance including cleaning of the device,
  obtain maintenance information indicating maintenance scheduled to be performed on the device from a memory, the maintenance information including time information indicating a scheduled execution time of maintenance,
  update the time information based on the self-maintenance information, and
  send a notification for prompting maintenance of the device based on the time information.

2. The maintenance management apparatus according to claim 1, wherein the processing circuitry is configured to cause the maintenance management apparatus to:
 update the time information at a time determined based on at least one of the time the self-maintenance has been performed, an installation date of the device, or a usage amount of the device.

3. The maintenance management apparatus according to claim 1, wherein the processing circuitry is configured to cause the maintenance management apparatus to:
 obtain, from the maintenance information, execution interval information indicating an execution interval of maintenance;
 update the execution interval information based on the self-maintenance information; and
 update the time information based on the updated execution interval information.

4. The maintenance management apparatus according to claim 1, wherein the processing circuitry is configured to cause the maintenance management apparatus to:
 send the notification in response to the scheduled execution time of maintenance indicated by the time information passing without the self-maintenance information indicating that maintenance has been performed on the device being obtained.

5. The maintenance management apparatus according to claim 1, wherein the processing circuitry is configured to cause the maintenance management apparatus to:
send the notification in response to a threshold time passing without the self-maintenance information indicating that maintenance has been performed on the device being obtained, the threshold time being before the scheduled execution time of maintenance indicated by the time information.

6. The maintenance management apparatus according to claim 1,
wherein the memory stores respective maintenance information for each of the one or more devices, and
the processing circuitry is configured to cause the maintenance management apparatus to display a maintenance execution status of each of the one or more devices based on the respective maintenance information.

7. A maintenance management system comprising:
the maintenance management apparatus according to claim 1;
a collection device including second processing circuitry configured to cause the collection device to,
collect the self-maintenance information from the device, and
transmit the self-maintenance information to the maintenance management apparatus; and
an information processing apparatus including third processing circuitry configured to cause the information processing apparatus to,
allow the user to input the self-maintenance information, and
receive the notification from the maintenance management apparatus.

8. The maintenance management apparatus according to claim 1, wherein the processing circuitry is configured to cause the maintenance management apparatus to:
send the notification via email.

9. The maintenance management apparatus according to claim 1, wherein the processing circuitry is configured to cause the maintenance management apparatus to:
generate a notification indicating that the self-maintenance information has been obtained.

10. The maintenance management apparatus according to claim 1, wherein the processing circuitry is configured to cause the maintenance management apparatus to:
determine whether a threshold time has passed, the threshold time being before the scheduled execution time of maintenance indicated by the time information;
send the notification in response to a determination that the threshold time has passed;
determine whether the scheduled execution time of maintenance has passed, in response to a determination that the threshold time has not passed; and
send the notification in response to a determination that the scheduled execution time has passed.

11. A method of managing maintenance on one or more devices, the method comprising:
obtaining self-maintenance information from a user via an input screen indicating a time at which self-maintenance has been performed on a device of the one or more devices by the user, the self-maintenance including cleaning the device;
obtaining maintenance information indicating maintenance scheduled to be performed on the device from a memory, the maintenance information including time information indicating a scheduled execution time of maintenance;
updating the time information based on the self-maintenance information; and
sending a notification for prompting maintenance of the device based on the time information.

12. The method of claim 11, wherein
the updating is performed at a time determined based on at least one of the time the self-maintenance has been performed, an installation date of the device, and a usage amount of the device.

13. The method of claim 11, further comprising:
obtaining, from the maintenance information, execution interval information indicating an execution interval of maintenance;
updating the execution interval information based on the self-maintenance information; and
updating the time information based on the updated execution interval information.

14. The method of claim 11, further comprising:
sending the notification in response to the scheduled execution time of maintenance indicated by the time information passing without the self-maintenance information indicating that maintenance has been performed on the device being obtained.

15. The method of claim 11, further comprising:
sending the notification in response to a threshold time passing without the self-maintenance information indicating that maintenance has been performed on the device being obtained, the threshold time being before the scheduled execution time of maintenance indicated by the time information.

16. The method of claim 11, wherein the memory stores respective maintenance information for each of the one or more devices, the method further comprising:
displaying a maintenance execution status of each of the one or more devices based on the respective maintenance information.

17. The method of claim 11, wherein the sending the notification includes sending the notification via email.

18. The method of claim 11, further comprising:
generating a notification indicating that the self-maintenance information has been obtained.

19. The method of claim 11, further comprising:
determining whether a threshold time has passed, the threshold time being before the scheduled execution time of maintenance indicated by the time information;
sending the notification in response to a determination that the threshold time has passed;
determining whether the scheduled execution time of maintenance has passed, in response to a determination that the threshold time has not passed; and
sending the notification in response to a determination that the scheduled execution time has passed.

20. A non-transitory recording medium storing instructions that, when executed by one or more processors, cause the processors to perform a method of managing maintenance on one or more devices, the method comprising:
obtaining self-maintenance information from a user via an input screen indicating a time at which self-maintenance has been performed on a device of the one or more devices by the user, the self-maintenance including cleaning the device;
obtaining maintenance information indicating maintenance scheduled to be performed on the device from a memory, the maintenance information including time information indicating a scheduled execution time of maintenance;

updating the time information based on the self-maintenance information; and sending a notification for prompting maintenance of the device based on the time information.

21. A maintenance management system for managing maintenance on one or more devices, the maintenance management system comprising:

processing circuitry configured to cause the maintenance management system to, obtain, based on a user input, self-maintenance information indicating a time at which self-maintenance has been performed on a device of the one or more devices by the user, the self-maintenance including cleaning of the device, and update a time information based on the self-maintenance information, the time information indicating a scheduled execution time of maintenance to be performed on the device.

22. The maintenance management system according to claim 21, wherein the self-maintenance information is input by a user via an input screen.

23. The maintenance management system according to claim 21, wherein the self-maintenance includes cleaning of an image forming apparatus.

24. The maintenance management system according to claim 21, wherein the processing circuitry is configured to cause the maintenance management system to send a notification for prompting maintenance of the device based on the time information.

25. A method of managing maintenance on one or more devices, the method comprising:

obtaining, based on a user input, self-maintenance information indicating a time at which self-maintenance has been performed on a device of the one or more devices by the user, the self-maintenance including cleaning of the device; and updating a time information based on the self-maintenance information, the time information indicating a scheduled execution time of maintenance to be performed on the device.

26. A non-transitory recording medium storing instructions that, when executed by one or more processors, cause the one or more processors to perform a method of managing maintenance on one or more devices, the method comprising:

obtaining, based on a user input, self-maintenance information indicating a time at which self-maintenance has been performed on a device of the one or more devices by the user, the self-maintenance including cleaning of the device; and updating a time information based on the self-maintenance information, the time information indicating a scheduled execution time of maintenance to be performed on the device.

* * * * *